United States Patent [19]
Seino et al.

[11] 3,830,212
[45] Aug. 20, 1974

[54] CHAIN-SPROCKET TRANSMISSION MEANS IN PISTON-CRANK MECHANISM

[75] Inventors: Tetsuya Seino; Masashi Mizutani, both of Shizuoka, Japan

[73] Assignee: Yamaha Hatsudoki Kabushiki Kaisha, Iwata, Shizuoka, Japan

[22] Filed: July 24, 1973

[21] Appl. No.: 382,140

[30] Foreign Application Priority Data
July 31, 1972   Japan.............................. 47-76617

[52] U.S. Cl.................. 123/192 B, 74/602, 74/603
[51] Int. Cl............................................ F02b 75/06
[58] Field of Search............ 123/192 B; 74/602, 603

[56] References Cited
UNITED STATES PATENTS
3,474,768   10/1969   Anesetti.......................... 123/192 B

FOREIGN PATENTS OR APPLICATIONS
997,076   10/1949   France................................... 74/603

*Primary Examiner*—Manual A. Antonakas
*Assistant Examiner*—Daniel J. O'Connor
*Attorney, Agent, or Firm*—Spensley, Horn & Lubitz

[57] ABSTRACT

Chain-sprocket transmission means comprising a crankshaft, at least two driven shafts, sprockets mounted, one for each, on those shafts, and a chain extended around and engaged with the sprockets for transmitting the rotation of the crankshaft to the driven shafts, at least two of the sprockets on the driving and driven sides having centers of rotation eccentric relative to their axes of rotation at predetermined eccentric angles.

6 Claims, 6 Drawing Figures

CHAIN-SPROCKET TRANSMISSION MEANS IN PISTON-CRANK MECHANISM

BACKGROUND OF THE INVENTION

This invention relates to a chain-sprocket transmission means in the piston-crank mechanism of a reciprocating-piston type internal-combustion engine, so designed that the primary components of fluctuations in the rotational speed of the crankshaft caused by the combined piston-crank motion can be completely eliminated in the process of transmission of power from the crankshaft to driven members.

The piston-crank mechanism is used to take out as power output the reciprocating motion of a piston by converting it into the rotary motion of the crankshaft or vice versa. The crankshaft speed often fluctuates periodically in cycles of operation each representing one complete revolution of the shaft. This tendency, characteristic of the piston-crank mechanism, occurs most frequently in internal-combustion engines with a small number of pistons, e.g., in single- and twin-cylinder engines. The fluctuation in the rotational speed of the crankshaft inposes not only impulsive tensile loads on the chain transmitting the rotation from the shaft to the driven shafts but also impulsive loads on the systems to which the power is transmitted via the driven shafts. It thus can shorten the lives of those engine components. This is particularly true of the arrangements in which masses with large moments of inertia, e.g., counterweights, are attached to the driven shafts.

SUMMARY OF THE INVENTION

In accordance with this invention, a drive sprocket is mounted on the crankshaft or drive shaft whose angular velocity varies periodically with the cycles of operation each representing one revolution of the shaft, not less than two driven sprockets are provided which transmit rotary motion from the drive sprocket by means of a drive chain, and the centers of at least two of the sprockets are offset from their axes of rotation, the eccentricities and phase angles being such that the chain take-up and pay-out speeds of the adjacent sprockets are equalized and that at least one driven sprocket is freed from the fluctuation in the angular velocity.

An object of the present invention is to provide a chain-sprocket transmission means capable of completely eliminating the primary components of fluctuations in the rotational speed of a crankshaft in the process of transmission of the rotation from the shaft to the shafts being driven thereby.

Another object of the invention is to provide a chain-sprocket transmission means capable of precluding the fluctuations in the tension of a chain transmitting the rotation from a crankshaft to the driven shafts.

DETAILED DESCRIPTION

Figure 1:
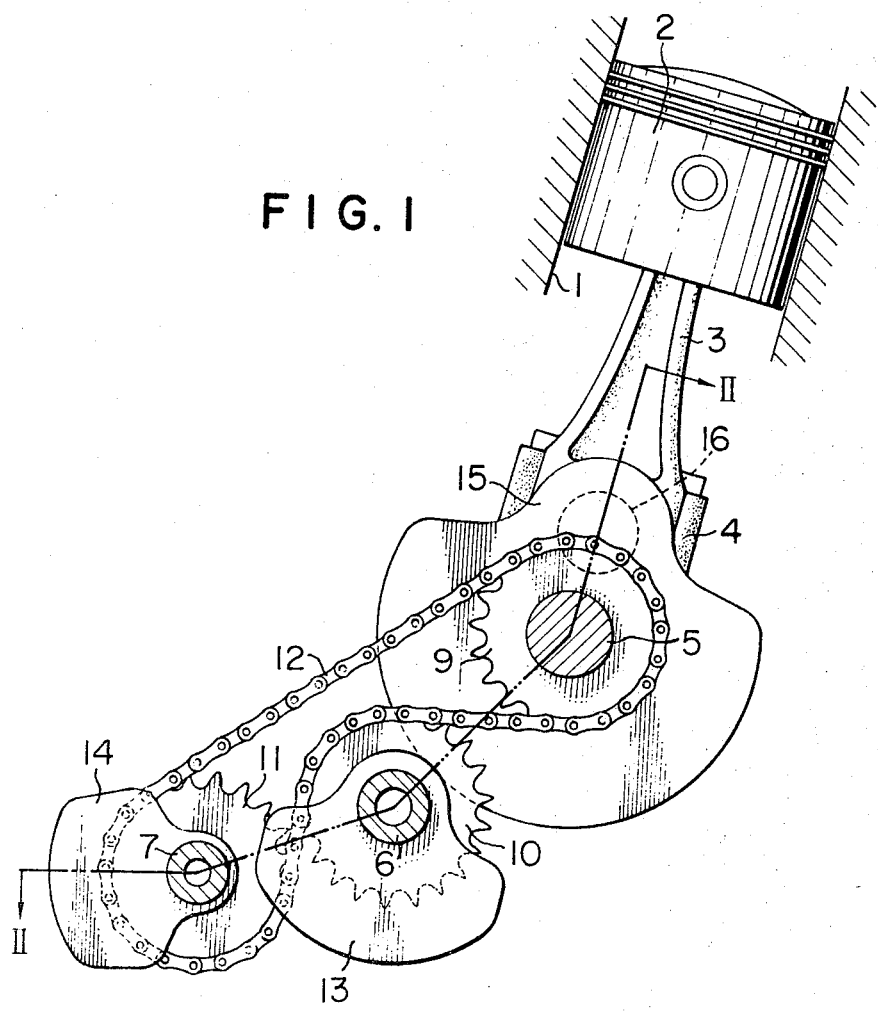
FIG. 1 is a side plane view, partially in section, of one form of chain-sprocket transmission means embodying the present invention.
Figure 2:
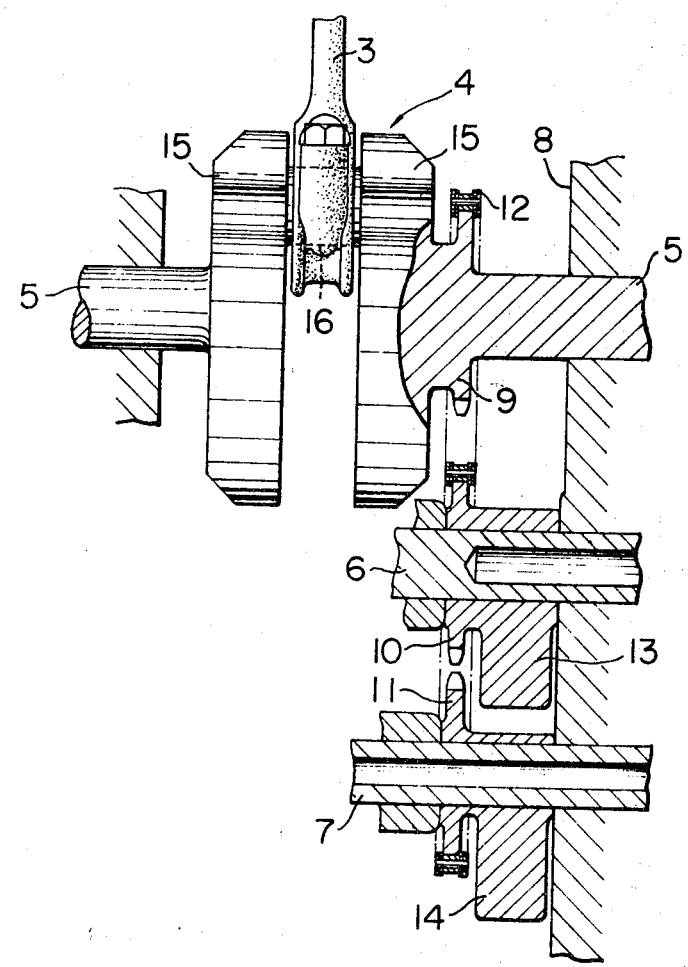
FIG. 2 is a sectional view taken along the line II—II of FIG. 1.

As shown in FIGS. 1 and 2, a piston 2 to reciprocate in a cylinder 1 of an internal-combustion engine of the reciprocating piston type has a connecting rod 3 swingably connected thereto as in ordinary internal-combustion engines. A crankshaft 4, rotatably mounted in a crankcase 8, has crank journals 5, crank webs 15, and a crankpin 16 revolvably connected to the connecting rod 3. In parallel with one of the crank journals 5, shown as hatched, of the crankshaft 4, there are disposed first and second shafts 6, 7, both rotatably mounted in the crankcase 8.

The crank journal 5 and the first and second shafts 6, 7 are provided, respectively, with a drive sprocket 9 and first and second sprockets 10, 11. The driven sprockets 10, 11 are equal in the radius of pitch circle to the drive sprocket 9. A drive chain 12 is extended around the sprockets 9, 11 and is also engaged externally with the sprocket 10 located between the two sprockets. Accordingly, the first driven sprocket 10 is caused to run counter to the drive sprocket 9, whereas the second sprocket 11 rotates in the same direction as the drive sprocket.

Counterweights 13, 14 are attached to the sprockets 10, 11, respectively. In the embodiment being described, the counterweight 13 has a smaller inertial mass than the counterweight 14.

It is now assumed that, in a reciprocating piston type internal-combustion engine of the construction described above, the angular velocity $\omega_o$ of the crank 4 is given by the equation $$\omega_o = \Omega + \Delta\omega_o \sin \theta \tag{1}$$

where
$\Omega$ = mean angular velocity
$\Delta\omega_o$ = amplitude of primary components of fluctuations in angular velocity
$\theta$ = crank angle as measured at a point approx. 90° beyond the top dead center of the crankshaft, or at a point where the angular velocity $\omega_o$ of the crankshaft has gradually increased to cross the mean value of angular velocity of the crankshaft.

Figure 3:
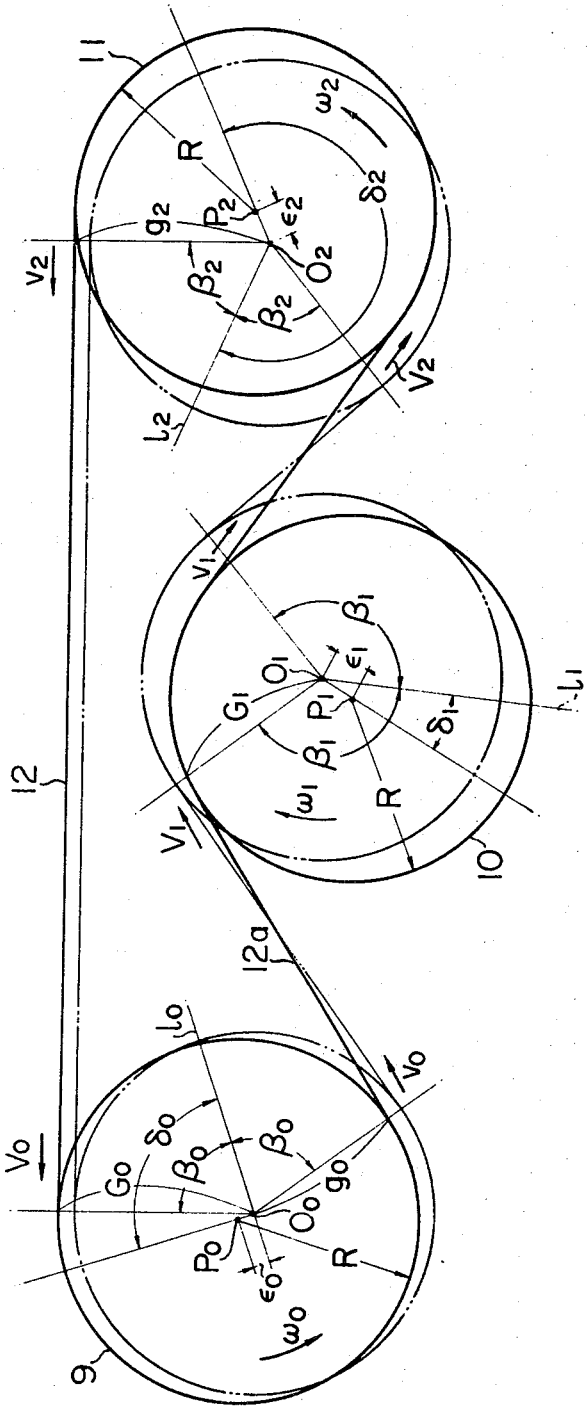
FIG. 3 is an explanatory diagram of a chain-sprocket transmission means embodying the invention, with the crankshaft in a position approximately 90° beyond its top dead center.

The pitch-circle centers $P_0$, $P_1$, $P_2$ of the sprockets 9, 10, 11, respectively, are offset from the corresponding centers of rotation $0_0$, $0_1$, $0_2$ by eccentricities $\epsilon_0$, $\epsilon_1$, $\epsilon_2$. The phase angles $\delta_0$, $\delta_1$, $\delta_2$ of the eccentricities are presented positively in the directions of rotation of the respective sprockets, as measured from the bisectors $l_0$, $l_1$, $l_2$ of the angles ($2\beta_0$, $2\beta_1$, $2\beta_2$) representing the circumferential portions of the sprockets 9, 10, 11 not engaged with the drive chain 12, on condition that $\theta = 0$, or in the crankshaft position approximately 9° beyond the top dead center. This relationship is diagrammatically illustrated in FIG. 3. The alternate long and two short dashes lines in the figure indicate the average positions of the sprockets and drive chain, and it is on the basis of these positions that the bisectors $l_0$, $l_1$, $l_2$ are drawn. It is also to be noted that the arrangement shown in FIG. 3 is somewhat exaggerated; the actual eccentricites $\epsilon_0$, $\epsilon_1$, $\epsilon_2$ are not so large.

Here, the angular velocities $\omega_1$, $\omega_2$ (containing only the primary components of fluctuations) of the first and second driven sprockets 10, 11 may generally be given as $$\omega_1 = \Omega + \Delta\omega_{C1}\cos\theta + \Delta\omega_{S1}\sin\theta$$
$$\omega_2 = \Omega + \Delta\omega_{C2}\cos\theta + \Delta\omega_{S2}\sin\theta \quad (2)$$

The radii of the pitch circles of the sprockets 9, 10, being R, the take-up speeds $V_0$, $V_1$, $V_2$ and pay-out speeds $V_0$, $V_1$, $V_2$, respectively, of the sprockets will be $$V_0 = \omega_0 \quad R+\epsilon_0\cos(\theta+\delta_0-\beta_0)$$
$$V_0 = \omega_0 \quad R+\epsilon_0\cos(\theta+\delta_0+\beta_0)$$
$$V_1 = \omega_1 \quad R+\epsilon_1\cos(\theta+\delta_1-\beta_1)$$
$$V_1 = \omega_1 \quad R+\epsilon_1\cos(\theta+\delta_1+\beta_1)$$
$$V_2 = \omega_2 \quad R+\epsilon_2\cos(\theta+\delta_2-\beta_2)$$
$$V_2 = \omega_2 \quad R+\epsilon_2\cos(\theta+\delta_2+\beta_2) \quad (3)$$

Rearranging the foregoing by substituting Eqs. 1 and 2 into Eq. 3 under the conditions of $R \gg \epsilon_i$, $\Omega \gg \Delta\omega_{Ci}$, $\Omega \gg \Delta\omega_{Si}$ (where $i = 0, 1, 2$) gives the following solutions, provided that $\Delta\omega_{C1} = \Delta\omega_{S1} = \Delta\omega_{C2} = \Delta\omega_{S2} = 0$:

$$\epsilon_0 \cos\delta_0 = 0$$
$$\epsilon_0 \sin\delta_0 = r[\sin(\beta_1+\beta_2)/\sin(\beta_0+\beta_1+\beta_2)]$$
$$\epsilon_1 \cos\delta_1 = -r[(\sin\beta_0 \cdot \sin\beta_2)/\sin(\beta_0+\beta_1+\beta_2)]$$
$$\epsilon_1 \sin\delta_1 = -r[(\sin\beta_0 \cdot \cos\beta_2)/\sin(\beta_0+B_1+B_2)]$$
$$\epsilon_2 \cos\delta_2 = r[(\sin\beta_0 \cdot \sin\beta_1)/\sin(\beta_0+\beta_1+\beta_2)]$$
$$\epsilon_2 \sin\delta_2 = -r[(\sin\beta_0 \cdot \cos\beta_1)/\sin(\beta_0+\beta_1+\beta_2)] \quad (4)$$

$$r = R \cdot (\Delta\omega_0/\Omega)$$

In Eq. 4, only six quantities $\epsilon_0$, $\epsilon_1$, $\epsilon_2$, $\delta_0$, $\delta_1$, $\delta_2$ are unknown. These are determinable because all other values can be given as conditions for designing. In the foregoing equations, the conditions $V_0 = V_2$, $V_1 = V_0$, and $V_2 = V_1$ mean that the free run of the drive chain 12 between any given pair of the sprockets will be neither stretched taut nor loosened. Also, the condition $\Delta\omega_{C1} = \Delta\omega_{S1} = \Delta\omega_{C2} = \Delta\omega_{S2} = 0$ indicates that there is no fluctuation in the angular velocities of the first and second sprockets. Thus, in chain-sprocket transmission means where the distances and phase angles of the eccentricities of individual sprockets are given on the basis of the $\epsilon_0$, $\epsilon_1$, $\epsilon_2$, $\delta_0$, $\delta_1$, $\delta_2$ as calculated from Eq. 4, the drive chain 12 does neither stretch nor sag, and the primary components of fluctuations in the angular velocities of the first and second driven sprockets 10, 11 are eliminated.

Stated differently, once the relative distances and phase angles of the eccentricities of the sprockets have been set as described above, it follows that, despite the off-center positions of the sprockets, the chain pay-out velocity $v_0$ of the drive sprocket 9 is equal to the chain take-up velocity $V_1$ of the first driven sprocket 10, the pay-out velocity $v_1$ of the first driven sprocket 10 is equal to the take-up velocity $V_2$ of the second driven sprocket 11, and the pay-out velocity $v_2$ of the second driven sprocket 11 is equal to the take-up velocity $V_0$ of the drive sprocket 9. Consequently, the drive chain 12 is properly engaged with the sprockets without undue tension or slack. In this connection, it is assumed that the radius of rotation of the drive sprocket 9, as measured at the point where the free run 12a of the drive chain extended around and along the sprocket 9 and the first driven sprocket 10 comes into contact with the pitch circle of the sprocket 9, is $g_0$, and the radius of rotation of the sprocket 10, as measured at the point where the free run 12a contacts the pitch circle of the sprocket 10, is $G_1$. The ratio $g_0/G_1$ is less than 1 during the period of time in which the angular velocity $\omega_0$ of the crankshaft is higher than the mean angular velocity $\Omega$, and is greater than 1 when the reverse is the case, thus rendering it possible to eliminate fluctuations in the angular velocity of the first drive sprocket 10. The same applies to the ratio of rotational radii $G_0/g_2$ between the drive sprocket 9 and the second driven sprocket 11, and therefore the fluctuations in the angular velocity of the sprocket 11 are eliminated, too. Thus, the drive chain is not subjected to impulsive loads even with counterweights 13, 14 on the first and second driven sprockets 10, 11 that may have great moments of inertia.

Figure 4:
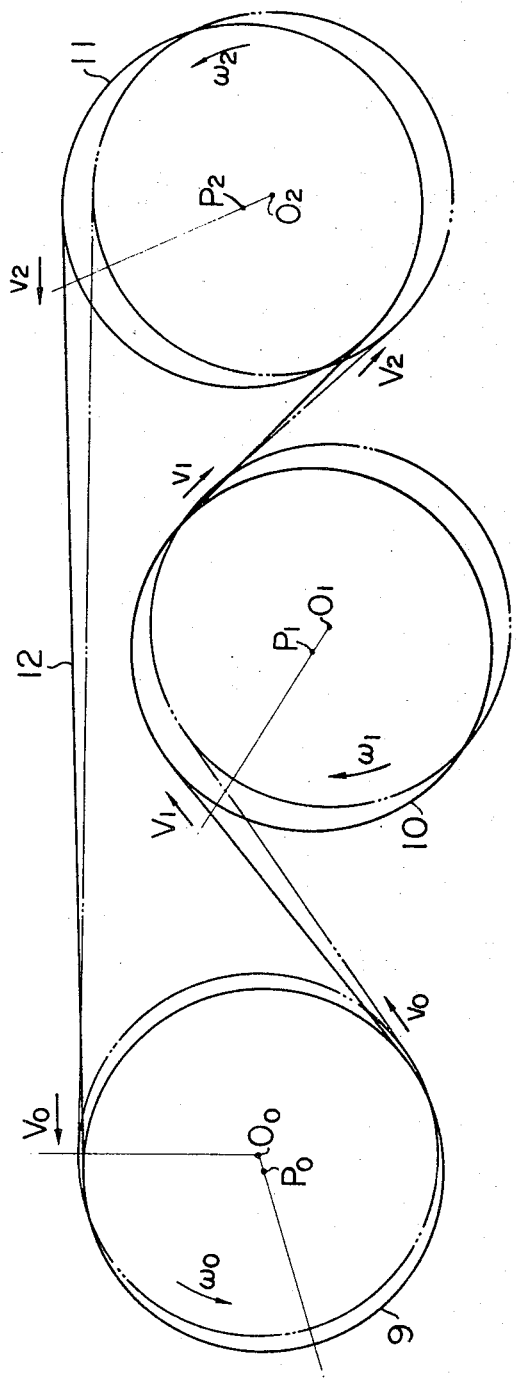
FIG. 4 is a similar explanatory diagram with the crankshaft approximately in its bottom dead center.

FIG. 4 shows the embodiment of FIG. 3 in the position advanced by 90°, or the positional relations of the individual sprockets at the point where the crankshaft is substantially at its bottom dead center. As shown in this diagram, the distance between the centers of the sprockets 9, 11 is shorter than in FIG. 3, but the drive chain 12 is accordingly urged inward by the sprocket 10. It will be appreciated at a glance that the chain 12 is free from any undue tension or slack.

The arrangement so far dealt with has been intended for the elimination of the fluctuations in the angular velocities of the both driven sprockets 10, 11. Now an arrangement in which the fluctuations in the angular velocity of either sprocket 10 or 11 are eliminated, will be described. In this case it is only necessary to offset any two out of the three sprockets 9, 10, 11 from their own centers of rotation.

By way of example, the elimination of the angular velocity fluctuations from the driven sprocket 10 having the larger counterweight 13 will be considered here. In the same way as already explained, Eqs. 1 and 2 are substituted into Eq. 3 for rearrangement, and conditions $V_0 = V_2$, $V_1 = v_0$, $V_2 = v_1$, and $\Delta\omega_{C1} = \Delta\omega_{S1} =$ are given. This will not bring the principal solution at once. However, if one of the conditions $\epsilon_0$, $\epsilon_1$, $\epsilon_2$ is made zero, e.g., $\epsilon_0 = 0$, then the following principal solution will be obtained in the same manner as already stated. This is also illustrated in FIG. 5.

$$\epsilon_1 \cos\delta_1 = r\sin\beta_1$$
$$\epsilon_1 \sin\delta_1 = r\cos\beta_1$$
$$\epsilon_2 \cos\delta_2 = -r(\sin^2\beta_1/\sin\beta_2)$$
$$\epsilon_2 \sin\delta_2 = r(\sin\beta_1 \cdot \cos\beta_1/\sin\beta_2) \quad (5)$$

In a chain-sprocket transmission means with the driven sprockets 10, 11 given the distances and phase angles of the eccentricities on the basis of the $\epsilon_1$, $\epsilon_2$, $\delta_1$, $\delta_2$ that were obtained from Eq. 5, the drive chain 12 is not excessively stretched or loosened. Moreover, the primary components of the angular velocity fluctuations of the first driven sprocket 10 are eliminated.

Figure 5:
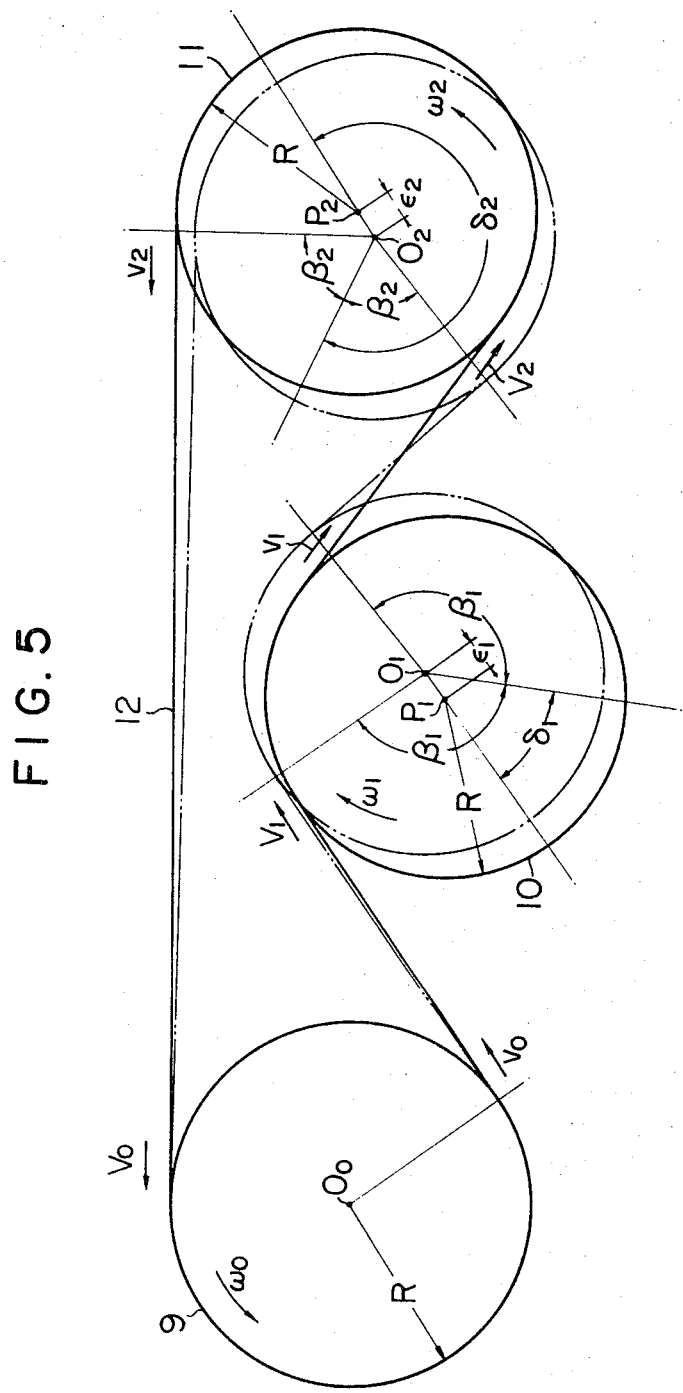
FIG. 5 is a view corresponding to FIG. 3 of another embodiment of the invention.
Figure 6:
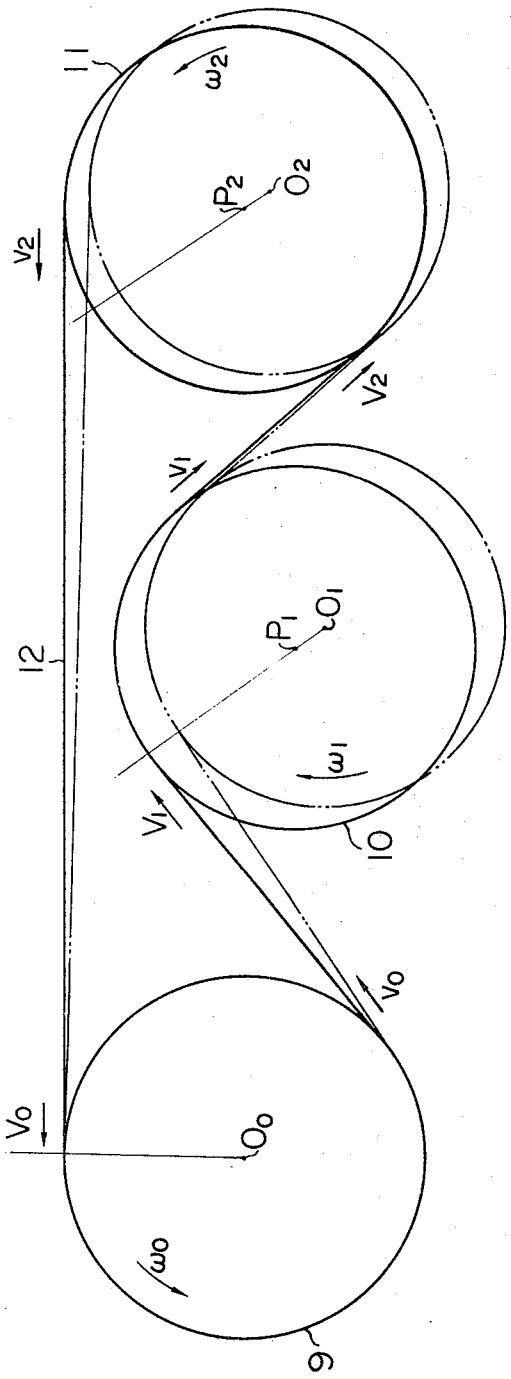
FIG. 6 is a view corresponding to FIG. 4 of the embodiment shown in FIG. 5.

FIG. 6 shows the embodiment of FIG. 5 advanced by 90°, or the sprockets in positions where the crankshaft is at its bottom dead center.

Although the present invention has been described in connection with the embodiments in which two driven sprockets are used, it is to be understood, of course, that the invention is not limited thereto but is applicable, as well, to chain-sprocket transmission means having more than two driven sprockets. Also, while the embodiments of the invention have been described as built in reciprocating-piston type internal-combustion engines, they may be incorporated in other apparatus having piston and crank mechanisms, e.g., compressors of the reciprocating piston type, too. Further, it is possible to eliminate not only the primary components but also the secondary components of the angular velocity fluctuations of the crankshaft, by designing the sprockets to have elliptical pitch circles with desired distances and phase angles of eccentricities.

What is claimed is:

1. In a piston-crank mechanism including a crankshaft rotatably mounted in a crankcase and having an angular velocity that varies periodically with cycles each of which is equal to the time required for a revolution of the crankshaft, a piston, and a connecting rod connected pivotally at one end to the piston and rotatably at the other end to the crankpin of the crankshaft; chain-sprocket transmission means comprising a drive sprocket fixedly mounted on the crankshaft, at least two driven sprockets each of which is rotatably supported by the crankcase and has a pitch circle with a radius equal to that of the drive sprocket, and a drive chain extended around or along the drive and driven sprockets, characterized in that the centers of at least two sprockets are offset from their axes of rotation, and the distances and phase angles of the eccentricities are so chosen as to satisfy the conditions that, at the both ends of the free run of the drive chain extended between any two adjacent sprockets, the pay-out and take-up velocities are always equal and the fluctuations in the angular velocity of at least one driven sprocket are substantially eliminated.

2. In a piston-crank mechanism including a crankshaft rotatably mounted in a crankcase and having an angular velocity that varies periodically with cycles each of which is equal to the time required for a revolution of the crankshaft, a piston, and a connecting rod connected pivotally at one end to the piston and rotatably at the other end to the crankpin of the crankshaft; a chain-sprocket transmission means comprising a drive sprocket fixedly mounted on the crankshaft, first and second driven sprockets each of which is rotatably supported by the crankcase and has a pitch circle with a radius equal to that of the drive sprocket, and a drive chain extended around or along the three sprockets, characterized in that the centers of at least two sprockets are offset from their axes of rotation, and the distances and phase angles of the eccentricities are so chosen as to satisfy the conditions that the ratio of the radius of rotation about the rotational center of the drive sprocket, as measured at the point where the pitch line of the free run of the drive chain directly extended between the drive sprocket and at least one driven sprocket comes into contact with the pitch circle of the drive sprocket, to the radius of rotation about the rotational center of the particular driven sprocket at the point where the same pitch line contacts said driven sprocket, is greater than 1 in the range where the angular velocity of the crankshaft is low and less than 1 in the range where the angular velocity is high, and that, at the both ends of the free run of the drive chain extended between any two adjacent sprockets, the pay-out and take-up velocities are equalized, whereby the angular velocity fluctuations of said at least one driven sprocket are substantially eliminated and said drive chain is kept from being excessively stretched nor loosened by the rotation of said sprockets.

3. In a reciprocating-piston type internal-combustion engine including a crankshaft rotatably mounted in a crankcase and having an angular velocity that varies periodically with cycles each of which is equal to the time required for a revolution of the crankshaft, a piston, and a connecting rod connected pivotally at one end to the piston and rotatably at the other end to the crankpin of the crankshaft; chain-sprocket transmission means comprising a drive sprocket fixedly mounted on the crankshaft, first and second driven sprockets each of which is rotatably supported by the crankcase and has a pitch circle with a radius equal to that of the drive sprocket, and a drive chain extended around or along the three sprockets, characterized in that the centers of at least two sprockets are offset from their axes of rotation, and the distances and phase angles of the eccentricities are so chosen as to satisfy the conditions that the ratio of the radius of rotation about the rotational center of the drive sprocket, as measured at the point where the pitch line of the free run of the drive chain directly extended between the drive sprocket and at least one driven sprocket comes into contact with the pitch circle of the drive sprocket, to the radius of rotation about the rotational center of the particular driven sprocket at the point where the same pitch line contacts said driven sprocket, is greater than 1 in the range where the angular velocity of the crankshaft is low and less than 1 in the range where the angular velocity is high, and that, at the both ends of the free run of the drive chain extended between any two adjacent sprockets, the pay-out and take-up velocities are equalized, whereby the angular velocity fluctuations of said at least one driven sprocket are substantially eliminated and said drive chain is kept from being excessively stretched nor loosened by the rotation of said sprockets.

4. Chain-sprocket transmission means as claimed in claim 2 wherein the centers of the three sprockets are offset from their axes of rotation, and the distances and phase angles of the eccentricities are so chosen as to satisfy the condition that the ratio of the radius of rotation about the rotational center of the drive sprocket, as measured at the point where the pitch line of the free run of the drive chain directly extended between the drive sprocket and each of said driven sprockets comes into contact with the pitch circle of the drive sprocket, to the radius of rotation about the rotational center of the particular driven sprocket at the point where the same pitch line contacts said driven sprocket, is greater than 1 in the range where the angular velocity of the crankshaft is low and less than 1 in the range where the angular velocity is high, whereby the angular velocity fluctuations of said first and second driven sprockets are substantially eliminated.

5. Chain-sprocket transmission means as claimed in claim 2 wherein the center of said drive sprocket in concentric with its axis of rotation, whereas the centers of said first and second driven sprockets are offset from their axes of rotation, and the distances and phase angles of the eccentricites are so chosen as to satisfy the condition that the ratio of the radius of rotation about the rotational center of the drive sprocket, as measured at the point where the pitch line of the free run of the drive chain directly extended between the drive sprocket and first driven sprocket comes into contact with the pitch circle of the drive sprocket, to the radius of rotation about the rotational center of the driven sprocket at the point where the same pitch line contacts said driven sprocket, is greater than 1 in the range where the angular velocity of the crankshaft is low and less than 1 in the range where the angular velocity is high, whereby the angular velocity fluctuations of said first driven sprocket are substantially eliminated.

6. Chain-sprocket transmission means as claimed in claim 2 wherein the first driven sprocket is disposed between said drive sprocket and second driven sprocket, and said drive chain is engaged inwardly with said drive and second driven sprockets and outwardly with said first driven sprocket.

* * * * *